United States Patent [19]

Furumoto et al.

[11] Patent Number: 4,656,536

[45] Date of Patent: Apr. 7, 1987

[54] APPARATUS FOR RECORDING AND REPRODUCING IDENTIFICATION WORDS ON A HELICALLY SCANNED TAPE

[75] Inventors: Mitsunobu Furumoto; Hiroshi Taniguchi, both of Osaka, Japan

[73] Assignee: Matsushita Electric Industrial Co., Ltd., Japan

[21] Appl. No.: 833,583

[22] Filed: Feb. 26, 1986

[30] Foreign Application Priority Data

Feb. 27, 1985 [JP] Japan .................................. 60-38035
Mar. 7, 1985 [JP] Japan .................................. 60-45418

[51] Int. Cl.⁴ ...................... G11B 5/008; G11B 23/36; G11B 27/30
[52] U.S. Cl. .................................. 360/72.2; 360/47; 360/48; 360/49; 360/50
[58] Field of Search ........................ 360/47, 48, 49, 50, 360/72.2, 74.4

Primary Examiner—George G. Stellar
Attorney, Agent, or Firm—Lowe, Price, LeBlanc, Becker & Shur

[57] ABSTRACT

In a helical-scan tape recorder, a digital signal having a series of M identification words of N bits each is generated. One of the N-bit words is a discrimination word identifying a particular combination of the other N-bit words. The M words are organized into J groups of I words each (where $J \times I = M$) and recorded with an information signal at spaced intervals within each of a series of sectors defined along each track of a recording tape so that the word groups are interleaved with the information signal and each of the recorded sub-blocks can be traced substantially simultaneously by a transducer head during a search mode. At least one of the word groups includes data bits identifying distinct, but mutually closely related items of information and discrimination bits which identify the data bits. During search mode, distribution bits can be detected with the data bits of the same word group to allow the closely related items of information to be displayed.

13 Claims, 28 Drawing Figures

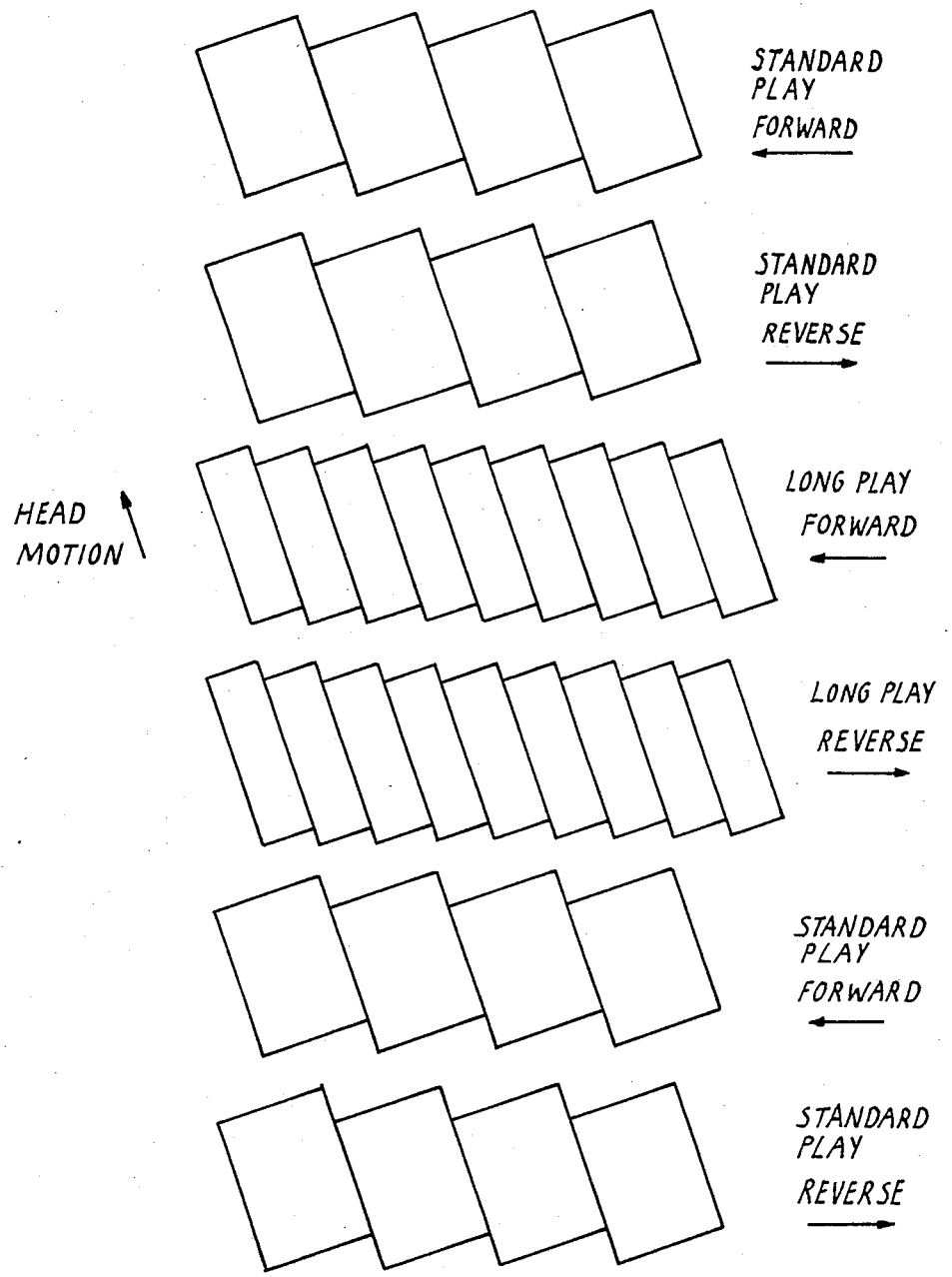

FIG. 6

| | ID5 (CONTROL) | | |
|---|---|---|---|
| B7 | 1 : DUBBING PROTECT | | |
| B6 | B5 | B6 | |
| | 1 | 0 | REC. START POINT |
| B5 | 0 | 1 | REC. END POINT |
| | 1 | 1 | RECORDED PERIOD |
| | 0 | 0 | IGNORE BITS |
| B4 | 0 : OTHER | | |
| B3 | CH1 | 1 : AUDIO | |
| | | 0 : OTHER | |
| B2 | B1 | B2 | |
| | 0 | 0 | MONAURAL |
| B1 | 0 | 1 | STEREO |
| | 1 | 0 | BILINGUAL |
| | 1 | 1 | OTHER |
| B0 | 1 : VALID | | |
| | 0 : INVALID (ALL "0") | | |

FIG. 7
*PRIOR ART*

|  |  | $B_0$ | $B_1$ | $B_2$ | $B_3$ | $B_4$ | $B_5$ | $B_6$ | $B_7$ |
|---|---|---|---|---|---|---|---|---|---|
| $ID_0$ | MODE NUMBER | 1 | 1 | 0 | 0 | 0 | 0 | 0 | 0 |
| $ID_1$ | YEAR | \multicolumn{4}{c}{×1 (0~9)} | | | ×10 (0~9) | | |
| $ID_2$ | MONTH | \multicolumn{8}{c}{JAN. ~ DEC.} | | | | | | | | |
| $ID_3$ | DAY OF THE MONTH | ×1 (0~9) | | | | ×10 (0~3) | | | |
| $ID_4$ | DAY OF THE WEEK | SUN. ~ SAT. | | | | | | | |

FIG. 8
*PRIOR ART*

|  |  | $B_0$ | $B_1$ | $B_2$ | $B_3$ | $B_4$ | $B_5$ | $B_6$ | $B_7$ |
|---|---|---|---|---|---|---|---|---|---|
| $ID_0$ | MODE NUMBER | 1 | 0 | 1 | 0 | 0 | 0 | 0 | 0 |
| $ID_1$ | PROGRAM NUMBER (1~99) | ×1 (0~9) | | | | ×10 (0~9) | | | |
| $ID_2$ | HOUR | ×1 (0~9) | | | | ×10 (0~2) | | | |
| $ID_3$ | MINUTE | ×1 (0~9) | | | | ×10 (0~5) | | | |
| $ID_4$ | SECOND | ×1 (0~9) | | | | ×10 (0~5) | | | |

FIG. 12

|     |             | $B_0$ | $B_1$ | $B_2$ | $B_3$ | $B_4$ | $B_5$ | $B_6$ | $B_7$ |
|-----|-------------|---|---|---|---|---|---|---|---|
| $ID_0$ | MODE NUMBER | 1 | 1 | 1 | 0 | 0 | 0 | 0 | 0 |
| $ID_1$ | DATA-0 | \multicolumn{8}{c} SEE FIG. 13 |
| $ID_2$ | | \multicolumn{8}{c} SEE FIGS. 14A TO 14F |
| $ID_3$ | | | | | | | | | |
| $ID_4$ | PRGM NUMBER | \multicolumn{4}{c} ×10 (0~9) | \multicolumn{4}{c} ×1 (0~9) |
| $ID_5$ | CONTROL | \multicolumn{8}{c} SEE FIG. 6 |

FIG. 13

| | | $ID_1$ | |
|---|---|---|---|
| $B_0$ | TAPE TRANSPORT DIRECTION | \multicolumn{2}{l} 0 : FORWARD  1 : REVERSE |
| $B_1$ $B_2$ | TAPE SPEED | $B_1$ $B_2$ 0  0 1  0 0  1 1  1 | STD PLAY LONG PLAY SUPER LONG PLAY RESERVED |
| $B_3$ $B_4$ $B_5$ | NEXT TRACK NUMBER | $B_3$ $B_4$ $B_5$ 0 1 1 1 0 1 0 0 1 1 1 0 0 1 0 1 0 0 1 1 1 | NO.1 NO.2 NO.3 NO.4 NO.5 NO.6 NO CHANGE |
| $B_6$ $B_7$ | BLANK DETECT | $B_6$ $B_7$ 1  0 1  1 0  1 | SOUND BLANK OTHER |

FIG.14A

TIME LAPSE FROM TAPE START

|     | $B_0$ | $B_1$ | $B_2$ | $B_3$ | $B_4$ | $B_5$ | $B_6$ | $B_7$ |
|-----|-------|-------|-------|-------|-------|-------|-------|-------|
| $ID_2$ | 0 | MINUTE ×10 (0~5) | | | MINUTE ×1 (0~9) | | | |
| $ID_3$ | 0 | SECOND ×10 (0~5) | | | SECOND ×1 (0~9) | | | |

FIG.14B

TIME LAPSE FROM TAPE START

|     | $B_0$ | $B_1$ | $B_2$ | $B_3$ | $B_4$ | $B_5$ | $B_6$ | $B_7$ |
|-----|-------|-------|-------|-------|-------|-------|-------|-------|
| $ID_2$ | 0 | HOUR ×10 (0~5) | | | HOUR ×1 (0~9) | | | |
| $ID_3$ | 1 | SECOND ×10 (0~5) | | | SECOND ×1 (0~9) | | | |

FIG.14C

TIME LAPSE FROM PROGRAM START

|     | $B_0$ | $B_1$ | $B_2$ | $B_3$ | $B_4$ | $B_5$ | $B_6$ | $B_7$ |
|-----|-------|-------|-------|-------|-------|-------|-------|-------|
| $ID_2$ | 1 | MINUTE ×10 (0~5) | | | MINUTE ×1 (0~9) | | | |
| $ID_3$ | 0 | SECOND ×10 (0~5) | | | SECOND ×1 (0~9) | | | |

FIG.14D TIME LAPSE FROM PROGRAM START

|     | $B_0$ | $B_1$ | $B_2$ | $B_3$ | $B_4$ | $B_5$ | $B_6$ | $B_7$ |
|-----|---|---|---|---|---|---|---|---|
| $ID_2$ | 1 | \multicolumn{3}{c}{HOUR ×10 (0~5)} | | | \multicolumn{3}{c}{HOUR ×1 (0~9)} | | |
| $ID_3$ | 1 | \multicolumn{3}{c}{SECOND ×10 (0~5)} | | | \multicolumn{3}{c}{SECOND ×1 (0~9)} | | |

FIG.14E

|     | $B_0$ | $B_1$ | $B_2$ | $B_3$ | $B_4$ | $B_5$ | $B_6$ | $B_7$ |
|-----|---|---|---|---|---|---|---|---|
| $ID_2$ | 0 | 1 | 0 | 0 | \multicolumn{4}{c}{MONTH} | | | | |
| $ID_3$ | \multicolumn{4}{c}{YEAR ×10 (0~9)} | | | | | \multicolumn{4}{c}{YEAR ×1 (0~9)} | | | | |

FIG.14F

|     | $B_0$ | $B_1$ | $B_2$ | $B_3$ | $B_4$ | $B_5$ | $B_6$ | $B_7$ |
|-----|---|---|---|---|---|---|---|---|
| $ID_2$ | 1 | 1 | 0 | 0 | \multicolumn{4}{c}{WEEK} | | | | |
| $ID_3$ | \multicolumn{4}{c}{DAY OF MONTH ×10 (0~3)} | | | | | \multicolumn{4}{c}{DAY OF MONTH ×1 (0~9)} | | | | |

FIG.15C

| B4 | B5 | B6 | B7 | |
|----|----|----|----|---|
| 0  | 1  | 1  | 1  | JANUARY |
| 1  | 0  | 1  | 1  | FEBRUARY |
| 0  | 0  | 1  | 1  | MARCH |
| 1  | 1  | 0  | 1  | APRIL |
| 0  | 1  | 0  | 1  | MAY |
| 1  | 0  | 0  | 1  | JUNE |
| 0  | 0  | 0  | 1  | JULY |
| 1  | 1  | 1  | 0  | AUGUST |
| 0  | 1  | 1  | 0  | SEPTEMBER |
| 1  | 0  | 1  | 0  | OCTOBER |
| 0  | 0  | 1  | 0  | NOVEMBER |
| 1  | 1  | 0  | 0  | DECEMBER |

FIG.15B

| B4 | B5 | B6 | B7 | |
|----|----|----|----|---|
| 1  | 1  | 1  | 1  | 0 |
| 0  | 1  | 1  | 1  | 1 |
| 1  | 0  | 1  | 1  | 2 |
| 0  | 0  | 1  | 1  | 3 |
| 1  | 1  | 0  | 1  | 4 |
| 0  | 1  | 0  | 1  | 5 |
| 1  | 0  | 0  | 1  | 6 |
| 0  | 0  | 0  | 1  | 7 |
| 1  | 1  | 1  | 0  | 8 |
| 0  | 1  | 1  | 0  | 9 |

FIG.15A

| B1 | B2 | B3 | |
|----|----|----|---|
| 1  | 1  | 1  | 0 |
| 0  | 1  | 1  | 1 |
| 1  | 0  | 1  | 2 |
| 0  | 0  | 1  | 3 |
| 1  | 1  | 0  | 4 |
| 0  | 1  | 0  | 5 |
| 1  | 0  | 0  | 6 |

| B4 | B5 | B6 | B7 | |
|---|---|---|---|---|
| 1 | 1 | 1 | 1 | SUNDAY |
| 0 | 1 | 1 | 1 | MONDAY |
| 1 | 0 | 1 | 1 | TUESDAY |
| 0 | 0 | 1 | 1 | WEDNESDAY |
| 1 | 1 | 0 | 1 | THURSDAY |
| 0 | 1 | 0 | 1 | FRIDAY |
| 1 | 0 | 0 | 1 | SATURDAY |

APPARATUS FOR RECORDING AND REPRODUCING IDENTIFICATION WORDS ON A HELICALLY SCANNED TAPE

BACKGROUND OF THE INVENTION

The present invention relates to a video tape recorder, and more particularly to the recording and reproduction of display data in digital form on a helically scanned magnetic tape.

Analog-to-digital conversion techniques are currently employed for high quality sound recording. In the standard 8-mm video tape recorder, tape is wound on a rotary drum over 180 degrees plus additional 36 degrees for recording digitized audio signals in the 36-degree additional sector of the track and recording analog video signals on the 180-degree sector, as illustrated in FIG. 1. Also known in the art is a VTR shown in FIG. 2 in which each of the skewed tracks is divided into six sectors and digitized multi-channel signals are recorded on respective sectors. Specifically, audio signal from a first sound channel is digitized into digital samples and sequentially recorded on sectors $BL_1$-A and $BL_1$-B and the digital samples of a second channel are sequentially recorded on sectors $BL_2$-A and $BL_2$-B, and so on, with the sectors $BL_1$ being recorded by transporting the tape in a forward direction and the sectors $BL_2$ being recorded by reversing the direction of tape motion at the tape end. Long-play mode is possible by transporting the tape at a reduced speed.

FIG. 3 is an illustration of a recording format for recording digitized multi-channel signals by transporting the tape in opposite directions at a low speed for "standard play" and at a high speed for "long play". With the video tape recorders of this type which permits recording of multiple source data, the user is allowed to select one or more desired operating modes and record identification words in specified areas of the tape to be detected automatically on playback in order to determine the tape speed according to the detected identification word, so that the tape speed can be automatically adjusted to the specified speed. It is desired to record visual information such as program numbers and time data at intervals. However, it is impossible to record all the visual information in the space currently available.

One approach is to divide such data into an M-bit header, or discrimination word and an (N-M)-bit control word as shown in FIG. 4 or organize M blocks of N bits each, each block forming an identification word as shown in FIG. 5. In the standard 8-mm video tape recorder 6 bytes are assigned to identification words designated $ID_0$ through $ID_5$, respectively, with the word $ID_5$ being used as a control signal having a format as shown in FIG. 6. Word $ID_0$ is a header, or discrimination word designated "mode number" which identifies a particular combination of the other identification words $ID_1$ through $ID_5$. Currently, six different discrimination words are available, two examples of which are shown in FIGS. 7 and 8.

FIG. 9 shows a standard format for 8-mm video tape recorders. In the NTSC system, the data to be recorded on each track comprises 132 blocks of sync, address, P and Q parities, 8-word data signals and a 16-bit CRC (cyclic redundant check) word. The identification words $ID_0$ through $ID_5$ are recorded in different parts of the track. Specifically, $ID_0$ to $ID_5$ are recorded on the 1st, 2nd, 45th, 46th, 89th and 90th blocks, respectively (shown at a, b, c, d, e and f). However, during search modes the tape is transported at higher speed than normal and as a result the video head crosses several tracks at different locations of each track. Since the identification words are recorded at spaced intervals, the discrimination word $ID_0$ cannot be detected with other identification words in a single high-speed scan. The loss of the discrimination word results in a failure to discriminate other identification words which may be detected from different tracks.

SUMMARY OF THE INVENTION

Accordingly, an object of the present invention is to overcome the above-mentioned problem by recording items of information which are distinct, but closely related to each other in such a position of tape which can be traced by a transducer head during high tape transport modes.

Specifically, a magnetic tape recording and reproducing apparatus having at least one transducer head mounted on a rotary drum to scan a magnetic tape wound thereon in a direction oblique to the length of the tape for exchanging an information signal with each of a plurality of parallel tracks when the tape is transported at a normal speed. Each of the tracks is divided into a series of sectors so that each of the information signals is recorded on each of a plurality of the sectors, the tape being transported at a higher speed than the normal speed during a search mode, the head scanning the tape in a direction different from the direction of scan at the normal speed when the search is effected. A series of M identification words of N bits each is generated. Each of the M words is formed into J groups of I identification words (where $J \times I = M$). At least one of the word groups comprises data bits representing distinct, but mutually closely related items of information and discrimination bits identifying the data bits and supplying the information signal and the word groups to the head during a recording mode to record the word groups at spaced intervals within each of the sectors and interleaved with the information signal. Each of the word groups is recorded in a location which can be detected by the head during the search mode to enable the discrimination bits of the detected word group to identify the data bits of the same word group.

In a preferred embodiment, the apparatus includes first and second transducer heads mounted on the rotary drum, the transducer heads having different azimuth angles with respect to each other. Each of the M identification words includes a discrimination word for identifying a particular combination of the other identification words of the M identification words. The information signal and the discrimination-word containing M identification words are interleaved and recorded using the first head. This allows the first head to sequentially detect a discrimination word from a given track and an identification word from a different track during a search mode to cause the latter to be discriminated by the detected discrimination word.

BRIEF DESCRIPTION OF THE DRAWINGS

The present invention will be described in further detail with reference to the accompanying drawings, in which:

FIG. 3 is an illustration of a pattern of tracks recording multi-channel PCM signals at different tape speeds in opposite directions of tape motion;

FIG. 6 is an illustration of a data structure of identification word $ID_5$ which is used in 8-mm video tape recording;

FIGS. 7 and 8 are illustrations of prior art data structures of identification words used in the 8-mm video tape recorder;

FIG. 12 is an illustration of identification words employed in the present invention;

FIG. 13 is an illustration of details of the identification word $ID_1$ of FIG. 12;

FIGS. 14A to 14F are illustrations of details of identification words $ID_2$ and $ID_3$ employed in the present invention;

FIGS. 15A to 15D are illustrations associated with FIGS. 14A to 14F;

FIG. 20 is an illustration of a pattern of tracks recorded in accordance with the flowchart of FIG. 18.

DETAILED DESCRIPTION

Figure 10:
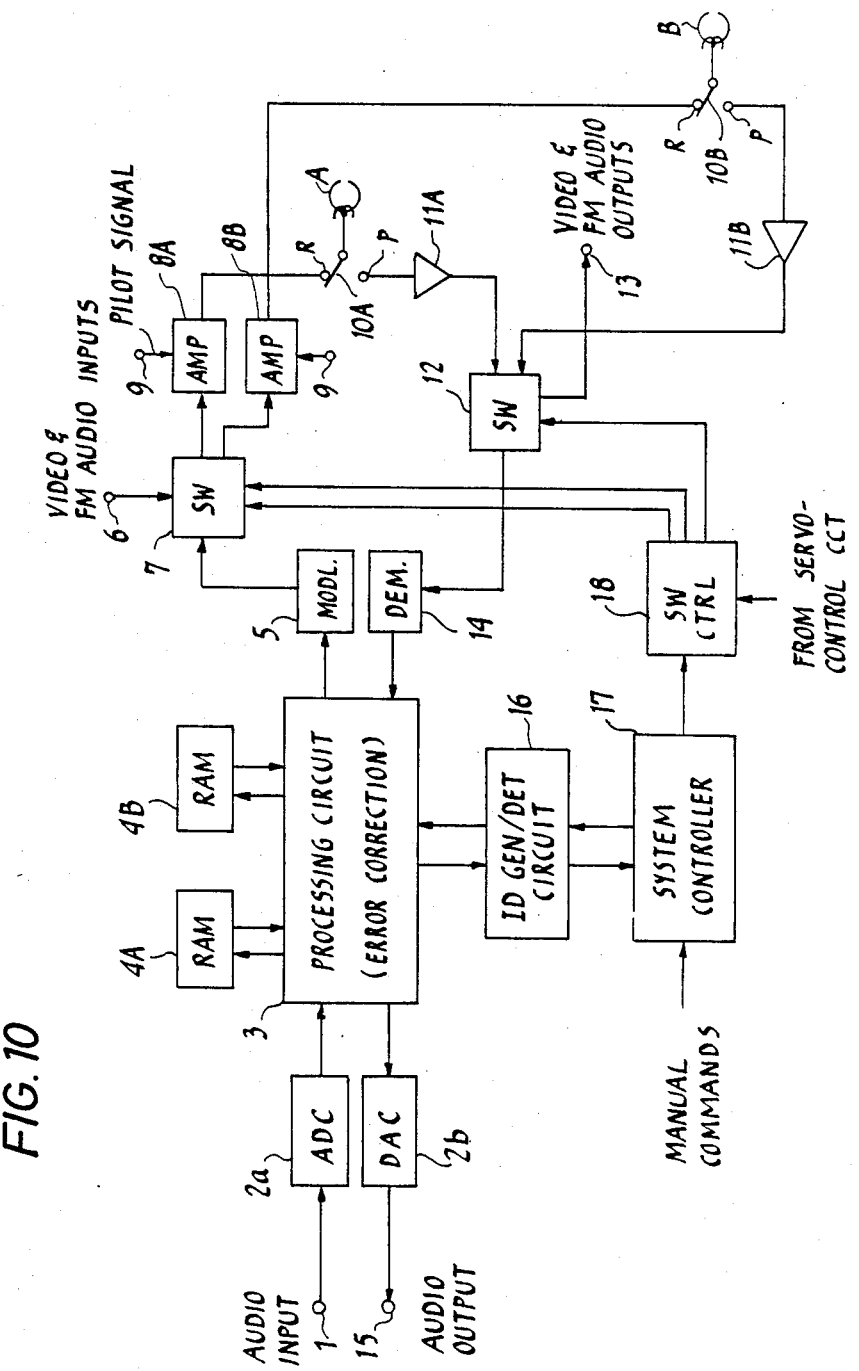
FIG. 10 is a block diagram of the magnetic tape recording and reproducing apparatus of the invention.

Referring to FIG. 10, there is shown an 8-mm video tape recorder embodying the present invention. Analog audio signal is applied through an input terminal 1 to an analog-to-digital converter 2a where it is digitized into 10-bit PCM digital samples, compressed in time dimension to 8-bit words and fed to a processing circuit 3. Eight-bit identification words are generated by an identification word generator/detector circuit 16 to be interleaved with the 8-bit digital audio signal in the processing circuit 3 under control of a system controller 17 to which input data are manually supplied from a data entry device, not shown. Error correction words are also generated by the processing circuit 3 to the 8-bit digital audio signal. The digital audio signal, identification words and error correction words are stored into random-access memories 4A, 4B alternately at 1/60-second intervals for NTSC systems or at 1/50-second intervals for CCIR (International Radio Consultative Committee) systems. The data stored in memories 4A, 4B are read at a higher speed so that the individual digital signals are interleaved. The interleaved digital bit stream is modulated by a modulator 5 into a form suitable for magnetic recording and reproduction and fed to a switching circuit 7 which is controlled by system controller 17. A switching control circuit 18 is connected to the system controller 17 and supplies a first switching signal to a switching circuit 7 to interleave the output of the modulator 5 with analog input signals applied through terminal 6. Switching control circuit 18 further receives a head switching pulse from a servo-control circuit, not shown, to supply a second switching signal to the switching circuit 7 to apply the interleaved signal alternately to recording amplifiers 8A and 8B. The signals applied to terminal 6 include an analog video signal and an FM audio signal. Recording amplifier 8A and 8B combine the outputs of switching circuit 7 with a pilot signal, or tracking servocontrol signal, on terminal 9 and feeds first and second video heads A and B through the "record" positions of mode select switches 10A and 10B, respectively. These video heads have different azimuth angles with respect to each other.

On playback, video heads A and B alternately supply their outputs through the "playback" position of switches 10A and 10B to preamplifiers 11A, 11B and thence to a switching circuit 12. Switching control circuit 18 receives control signals from the system controller 17 to de-interleave the signals alternately applied from the amplifiers 11A and 11B. The digital audio and identification signals are separated from the analog video and audio signals. The analog video and audio signals are applied to an output terminal 13 and the digital signals are demodulated by a demodulator 14 and fed to the processing circuit 3. Processing circuit 3 performs error correction on the demodulated digital signals and alternately writes them into the memories 4A and 4B and reads them at the same rate as the digital signals are written thereinto during the recording mode. The digital audio signal is separated from the identification words and applied to a digital-to-analog converter 2b and thence to an output terminal 15. The identification words are decoded by the generator/detector circuit 16 and fed to the system controller 17 to be utilized in various ways.

Figure 11:
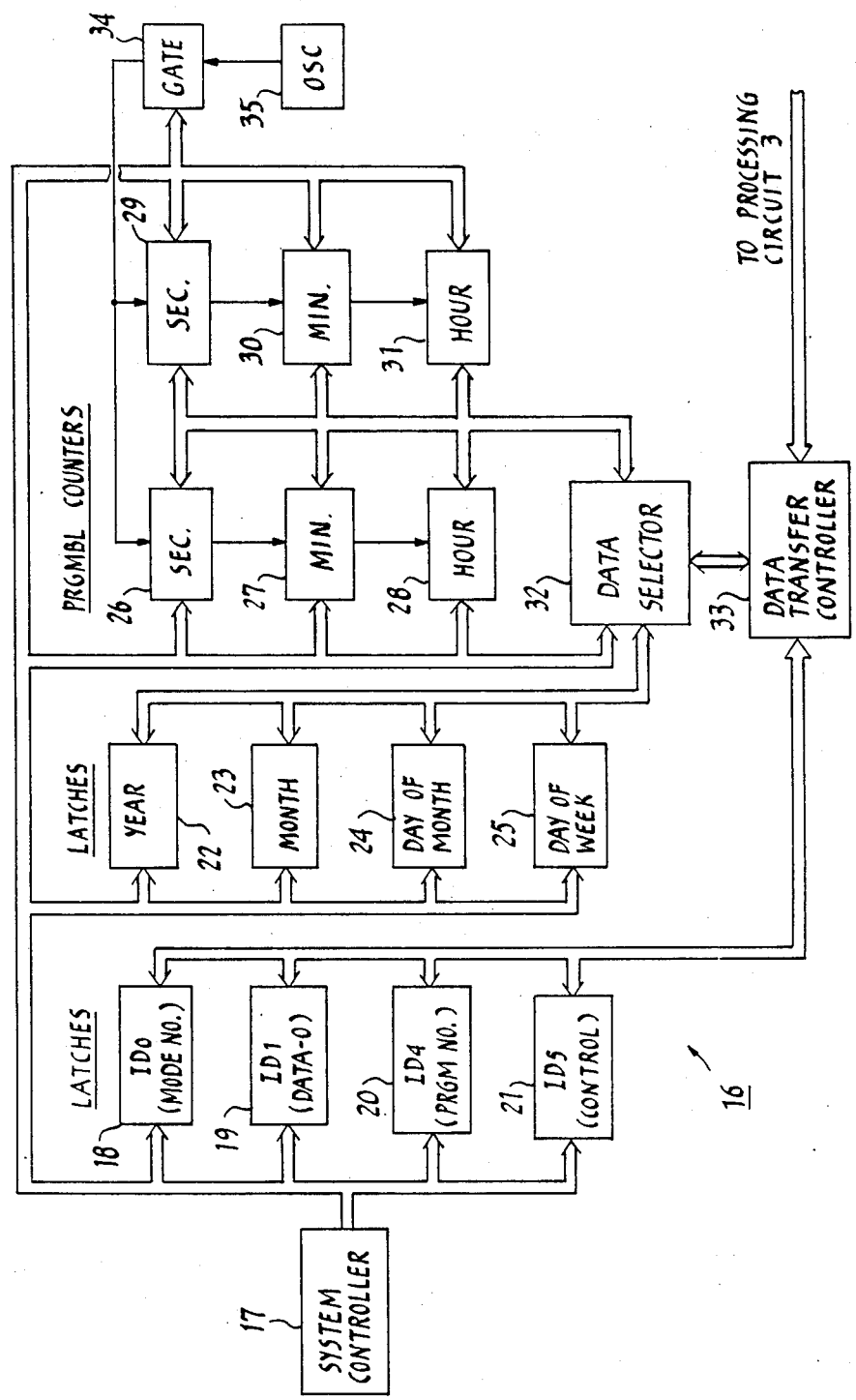
FIG. 11 is a block diagram illustrating the detail of the identification word generator/detector circuit of FIG. 10.

As shown in FIG. 11, identification word generator/detector 16 comprises a plurality of latches 18 through 25, a plurality of programmable counters 26 through 31, a data selector 32 and a data transfer controller 33. FIG. 12 illustrates the data structures of identification codes $ID_0$ to $ID_5$. These identification words are generated by the generator/detector circuit 16 and organized into a series of three recurrent groups of two identification words of 8 bits each. Under control of system controller 17, identification words $ID_0$, $ID_1$, $ID_4$ and $ID_5$ are stored respectively into latches 18 to 21. Identification words $ID_0$ and $ID_1$ are grouped together to form a first word group and identification words $ID_4$ and $ID_5$ are grouped together to form a third word group. Identification word $ID_0$ is a discrimination word which identifies a particular combination of the other identification words $ID_1$ to $ID_5$. In the specification, the discrimination word $ID_0$ is also defined as a "mode-number" indicating word. Mode-number word $ID_0$ is represented by higher three bits $B_0$, $B_1$ and $B_2$ and binary "1" is placed in each of these bit positions to indicate a mode $M_7$.

Identification words $ID_2$ and $ID_3$ are grouped together to form a second word group and are organized into one of six different combinations of words as shown respectively in FIGS. 14A to 14F. System controller 17 selects one of the data formats of FIGS. 14A to 14F according to manually entered commands and stores the selected word group into latches 22-25 and presets the programmable counters 26-31 to count values corresponding to the contents of the selected word group. The second word group formed by the identification words $ID_2$ and $ID_3$ includes discrimination bits and data bits representing distinct, but closely related items of information. In the illustrated embodiment, the closely related information items include time lapse data or calendar data as shown in FIGS. 14A to 14F. In the case of FIGS. 14A to 14D, the word group of $ID_2$ and $ID_3$ contains the time lapse data represented by data bits in binary positions $B_1$ to $B_7$ and the discrimination bits are represented by binary position $B_0$. In the case of FIGS. 14E and 14F, the $ID_2/ID_3$ word group contains the calendar data represented by binary positions $B_4$ to $B_7$ of identification word $ID_2$ and binary positions $B_0$ to $B_7$ of identification word $ID_3$ and the discrimination bits represented by binary positions $B_0$ to $B_4$ of identification word $ID_2$.

Figure 1:
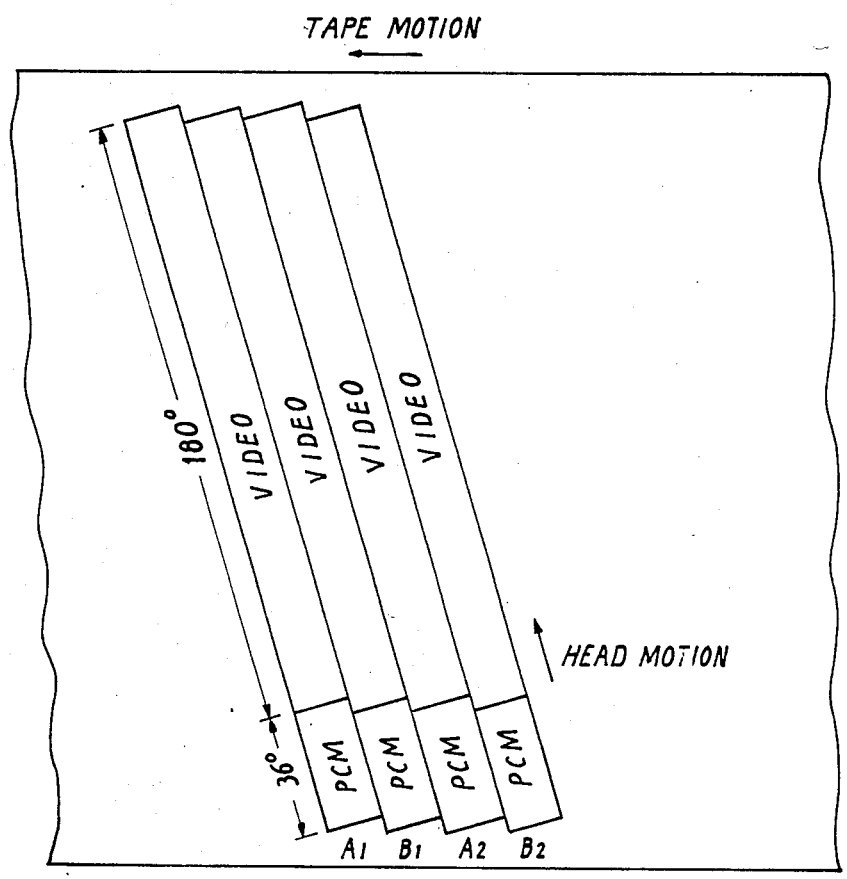
FIG. 1 is an illustration of a pattern of tracks traced on an 8-mm video tape.
Figure 2:
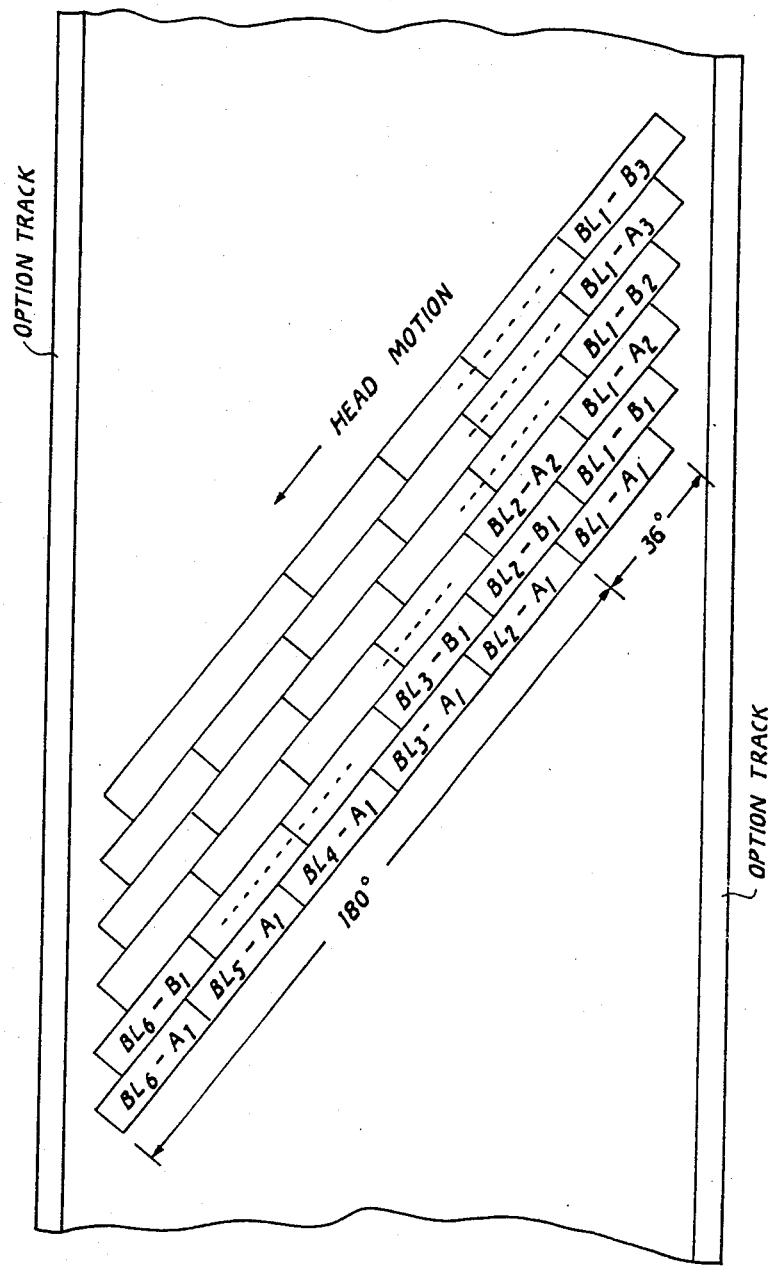
FIG. 2 is an illustration of a pattern of sectored tracks of an 8-mm video tape for recording multi-channel PCM signals on respective sectors.
Figure 5:
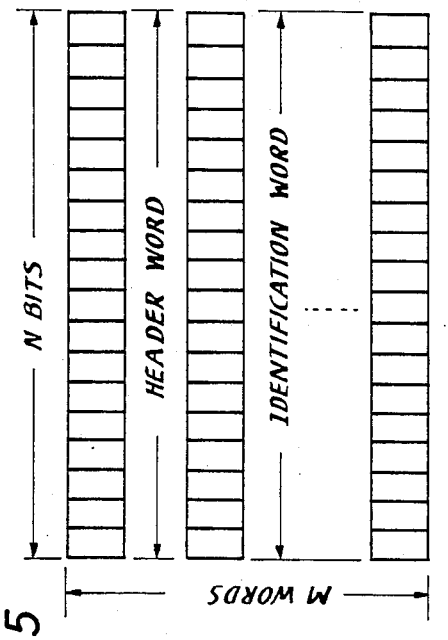
FIGS. 4 and 5 are illustrations of identification words currently in use.
Figure 4:
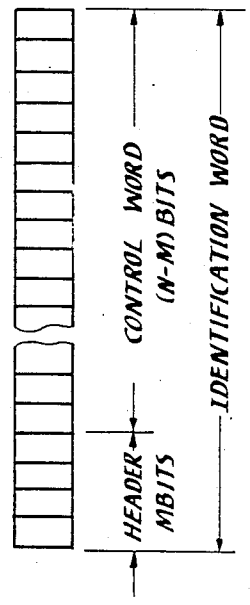
Figure 9:
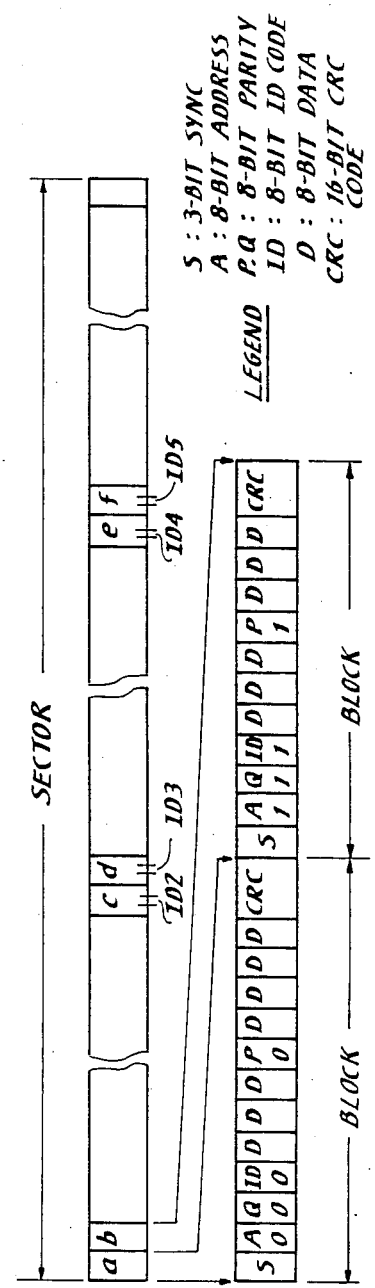
FIG. 9 is an illustration of the location of identification words in a given sector of a track on an 8-mm video tape on which PCM audio signals are interleaved with the identification words.

More specifically, system controller 17 stores the "year" and "month" data of FIG. 14E and latches 24 and 25 respectively store the "day of the month" and "day of the week" data of FIG. 14F. Programmable counters 26 and 27 are respectively preset to count values corresponding to the "minute" and "second" data indicated in FIG. 14A and counters 26 and 28 are respectively preset to count values corresponding to the "hour" and "second" data of FIG. 14B. Counters 29 and 30 are preset respectively to the "minute" and "second" data of FIG. 14C and counters 29 and 31 are preset to the "hour" and "second" data of FIG. 14D. Programmable counters 26 and 29 count 1-second clock pulses supplied from an oscillator 35 through an inhibit gate 34 to increment their "second" clock data and supply their carry signals to "minite" counters 27 and 30, respectively. Counters 27 and 30 increment their count values in response to the carry signals from counters 26 and 29 and apply their carry signals to "hour" counters 28 and 31. Inhibit gate 34 is enabled to prevent clock pulses from being applied to the counters 26 and 29 when the tape is stopped. The contents of latches 22-25 and counters 26-31 are read into a data selector 32 under control of the system controller 17. Identification words $ID_0$, $ID_1$, $ID_4$ and $ID_5$ from latches 18-21 and identification words $ID_2$ and $ID_3$ selected by data selector 32 are interleaved by a data transfer controller 33 and sent to the processing circuit 3 and interleaved with the 8-bit digital audio signal as described above. The first, second and third word groups are recorded at spaced intervals in locations as illustrated in FIG. 9 so that the bits of each word group can be substantially simultaneously detected by the transducer heads during search modes.

On playback, processing circuit 3 supplies data $ID_0$, $ID_1$, $ID_4$ and $ID_5$ to latches 18-21 and data $ID_2$ and $ID_3$ to data selector 32. These ID words are sent from data selector 32 to latches 22-25 and programmable counters 26-28 and 29-31. Clock pulses from oscillator 35 are not supplied to the counters 26 and 29 during playback. The reproduced identification words are written into latches 18-25 and and used to preset counter 26-31 and subsequently read into the system controller 17. For example, if the data stored in latch 19 is transferred to the system controller 17, the latter controls the direction and transport speed of tape according to the information contained in the supplied data and when the data stored in latches 22-25 are fed to system controller 17 the latter provides calender data, i.e., "year", "month", "day of the month" and "day of the week" on display.

During a search mode, the tape is transported at a speed much higher than the speed of the playback mode so that each head crosses several tracks at different locations. Since each word group can be detected during search mode, the data bits of the one of the second word groups which is detected can be identified with the aid of the discrimination bits of the detected word group. Discrimination word $ID^0$ detected from a given track during a search mode can be used to identify other identification words which are subsquently detected from other tracks.

Description of identification words $ID_0$ to $ID_5$ will now be made with reference to FIGS. 12 to 14. The mode-number word $ID_0$ is represented by bits $B_0$ to $B_7$ to identify the particular combination of the words $ID_1$ to $ID_5$. Word $ID_5$ indicates the type of signal to be recorded (stereo, monaural, audio or control signal) as shown in FIG. 6. Recorded programs are identified by a program-number word $ID_4$, FIG. 12.

Identification word $ID_1$ is shown in FIG. 13. Bit position $B_0$ indicates the tape transport direction, and bit positions $B_1$ and $B_2$ comprise a tape speed identifying word indicating standard play (SP), long play (LP) and superlong play (SLP) and optional modes. Bit positions $B_3$, $B_4$ and $B_5$ comprise a track number identifying word indicating the next adjacent track. Bit positions $B_6$ and $B_7$ comprise a blank detect word indicating whether the head is tracing a program of a blank between successive programs.

As shown in FIGS. 14A to 14F, identification words $ID_2$ and $ID_3$ constitute two-byte data indicating the length of time elapsed from the start of tape in "second", "minute" and "hour", the length of time elapsed from the start of each program in "second", "minute" and "hour", and the time of data recording in "day of the week", "day of the month", "month" and "year". Bit position $B_0$ of word $ID_2$ indicates whether the elapsed time is measured from the start of the tape or measured from the start of a program. Bit position $B_0$ of word $ID_3$ identifies whether bit positions $B_1$ to $B_7$ of $ID_2$ comprise "minute" or "hour" time data. Thus, for example, bit positions $B_1$ to $B_3$ indicate a tenth figure (zero to five) of "minute" and $B_4$ to $B_7$ indicate a unit figure (zero to nine) of "minute" when the B0 position of word $ID_3$ is binary "0" as shown in FIGS. 14A and 14C. The data format of tenth and unit figures is shown in FIGS. 15A and 15B.

Since the tenth figure "6" (represented by word "100" in FIG. 15A) does not exist, bit positions $B_1$-$B_3$ of word $ID_2$ are assigned to "100" respectively, as shown in FIGS. 14E and 14F, to indicate "day of the week", "day of the month", "month" and "year", with the header bit position $B_0$ of word $ID_2$ distinguishing between "month and year" information and "day and week" information. The "day and year" information is represented by a data format shown in FIG. 15B, the "month" information by a format shown in FIG. 15C and the "day of the week" information by a format shown in FIG. 15D. In this way, the binary data in bit position $B_0$ enables the identification words $ID_2$ and $ID_3$ to indicate several information items.

Figure 16:
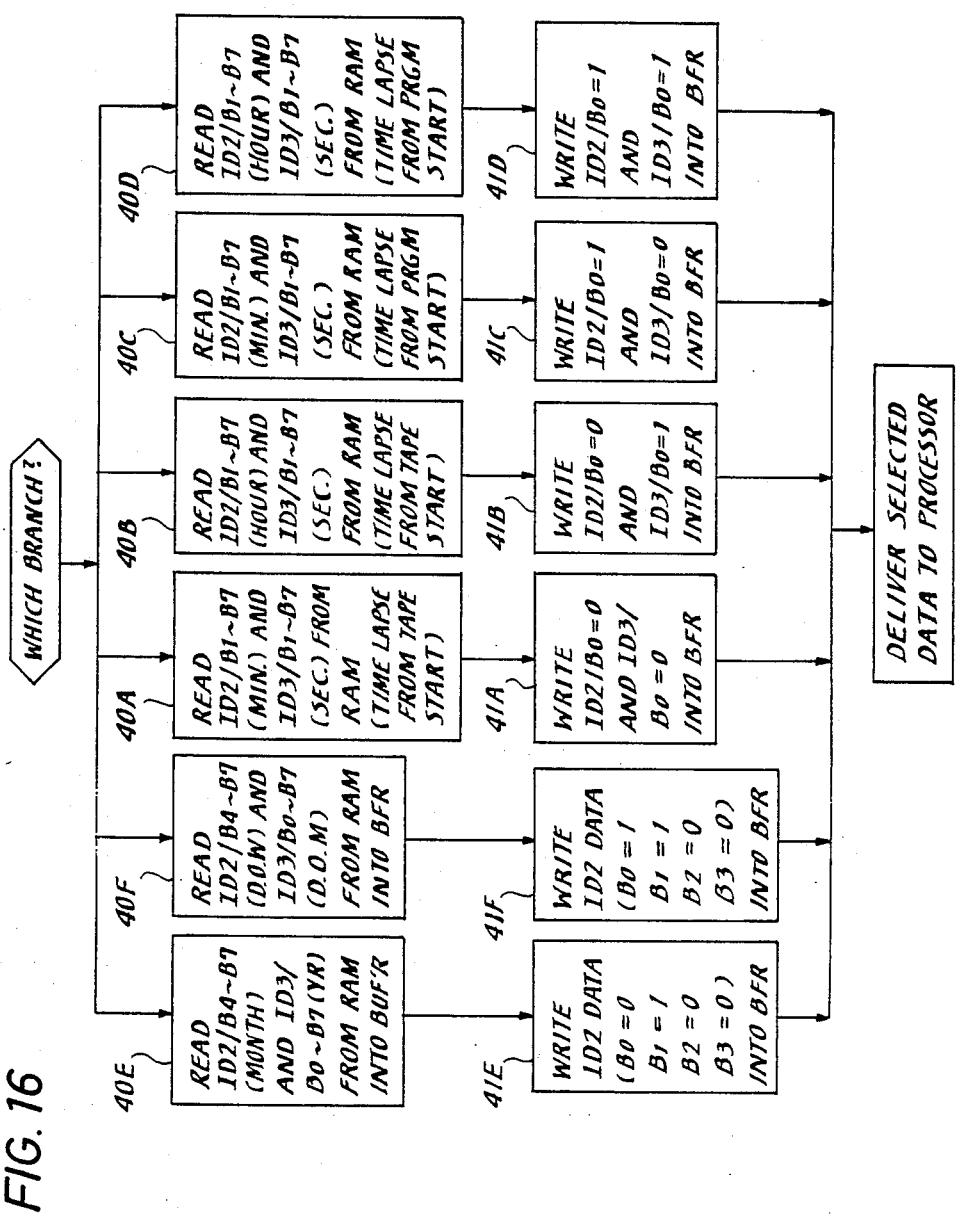
FIG. 16 is a flowchart describing a data reproducing operation of a microprocessor which implements the data selector and data transfer controller of FIG. 10.
Figure 17:
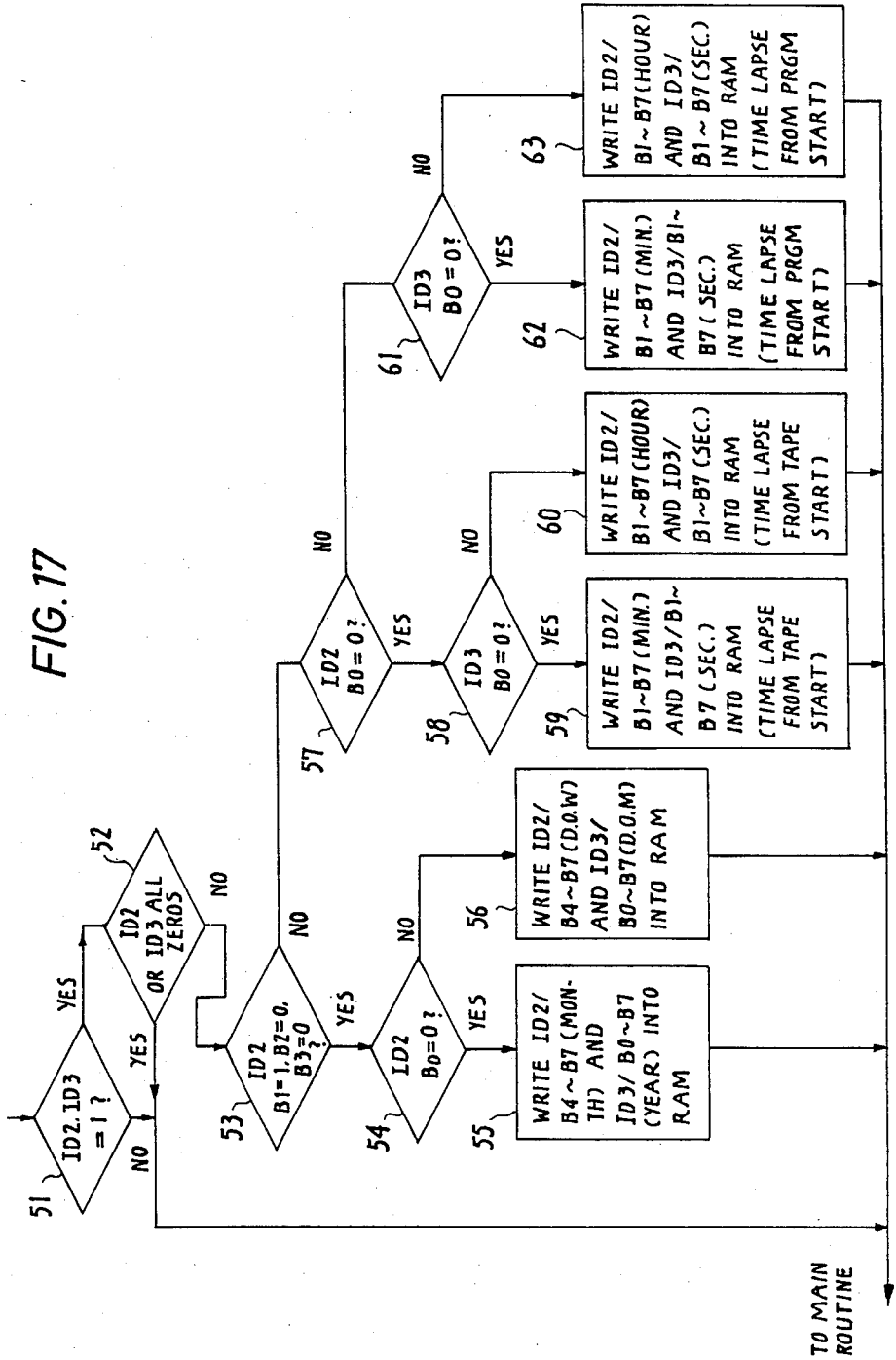
FIG. 17 is a flowchart describing a data reproducing operation of the microprocessor.

Data selector 32 and data transfer controller 33 can be implemented by a microprocessor and an instruction memory (ROM) having MPU operating instructions as shown in FIGS. 16 and 17. In this case, latches 18-25 and counters 26-31 can be implemented by a random access memory.

With the apparatus operating in a recording mode, the user enters appropriate data into the system controller 17, and the microprocessor starts operating in accordance with a program shown in FIG. 16 by reading data from the random access memory in response to a selection instruction issued from the system controller 17. The microprocessor selects one of operations blocks 40A through 40F which correspond respectively to FIGS. 14A to 14F and reads $B_0$ through $B_7$ data bits of identification words $ID_2$ and $ID_3$ from the random access memory. Specifically, block 40E directs the reading of $B_4$-$B_7$ data bits of $ID_2$ ("month") and $B0_0$-$B_7$ data bits of $ID_3$ ("year") from the memory into a buffer memory. Exit from block 40E is to operations block 41E which directs the writing of "0100" bits into $ID_2$ $B_0$-$B_3$ positions of the buffer, respectively, thus completing the data of FIG. 14E. Block 40F directs the reading of "day of the week" data bits from $ID_2$/$B_4$-$B_7$ positions and "day of the month" data bits from $ID_3$/-$B_0$-$B_7$ positions and writing them into the buffer memory. Block 40F directs the writing of data bits "1100" to the $ID_2$ $B_0$-$B_3$ positions of the buffer, completing the data of FIG. 14F. Likewise, blocks 40A to 40D each direct the reading of time data bits from $ID_2$/$B_1$-$B_7$ positions and from $ID_3$/$B_1$-$B_7$ positions. Blocks 41A to 41D direct the writing of appropriate bits into the $B_0$ positions of the buffer memory for $ID_2$ and $ID_3$. The data stored into the buffer memory is read in response to a timing signal and recorded into the positions c and d shown in FIG. 9. The microprocessor resets the "second", "minute" and "hour" data stored in the random access memory in response to the detection of tape start and in response to the beginning of a program and receives 1-second clock pulses to increment the "second" data. The program of FIG. 16 is executed at intervals corresponding to the transport speed of the tape. In addition to the identification words $ID_2$ and $ID_3$, other identification words $ID_0$, $ID_1$, $ID_4$ and $ID_5$ are recorded in positions a, b, e and f, FIG. 9 in a manner similar to that shown FIG. 16.

In a playback or automatic search mode or the like, each of the eight-bit identification words is checked for error in the processing circuit 3 and the error, if any, is corrected if it is correctable and a flag indicating the validity of the word is set up. Otherwise, no flag is established. In FIG. 17, execution of the programmed instructions begins with an interrupt which is generated in a main routine in response to the reception of each identification word from the processor 3. Decision block 51 tests to see if the flags are established for both 8-bit identification words $ID_2$ and $ID_3$. If there is none, exit from decision block 51 is to the main routine. If there is one, exit is to decision block 52 which tests for the presence of all binary zero's in at least one of the 8-bit words. If the answer is affirmative, exit is to the main routine. If at least one bit of binary "1" is detected, exit from decision block 52 is to decision block 53 which tests for the presence of bits "1", "0" and "0" in positions $B_1$, $B_2$ and $b_3$, respectively, of word $ID_2$. If there is one, exit is to decision block 54 which checks to see if the $B_0$ position of word $ID_2$ is binary 0. If the answer is affirmative, exit from decision block 54 is to operations block 55 which directs the writing of data bits in positions $B_4$ to $B_7$ of word $ID_2$ as "month" data into the RAM and directs the writing of data bits into positions $B_0$ to $B_7$ of word $ID_3$ as "year" data into the RAM. If the answer is negative, exit from decision block 54 is to operations block 56 which directs the writing of data bits in positions $B_4$ to $B_7$ of word $ID_2$ as "day of the week" data into the RAM and directs the writing of data bits into positions $B_0$ to $B_7$ of word $ID_3$ as "day of the month" data into the RAM.

If the word "100" is not detected in decision block 53, exit is to decision block 57 which tests for the presence of a binary 0 in the bit position $B_0$ of $ID_2$. If there is one, exit from decision block 57 is to decision block 58 which tests for the presence of a binary 0 in the bit position $B_0$ of $ID_3$. If the answer is affirmative, exit from block 58 is to operations block 59 which directs the writing of data bits into positions $B_1$ to $B_7$ of $ID_2$ into the RAM as "minute" data indicating the length of time from the start of tape and directs the writing of data bits in positions $B_1$ to $B_7$ of $ID_3$ into the RAM as "second" data indicating the length of time from tape start. If the answer of decision block 58 is negative, the program proceeds to operations block 60 which directs the transfer of "hour" data from bit positions $B_1$ to $B_7$ of $ID_2$ to the RAM as data representing time lapse from tape start and directs the transfer of "second" data from bit positions $B_1$ to $B_7$ of $ID_3$ to the RAM as representing time elapsed from tape start. Similar operations are performed by blocks 61, 62 and 63, if the answer of decision block 57 is negative, for writing "second", "minute" and "hour" data into the RAM as time lapse data indicating the length of time elapsed from program start.

As mentioned previously, since the "second, minute and hour" data are recorded in closely spaced positions of the tape so that these information items can be simultaneously detected by the reading head with a high probability during the search mode, it is possible to monitor the detected "minute" data in search of a desired program and when the latter is approached the tape speed can be lowered to monitor the "second" data for precisely locating the starting point of the desired program.

In the foregoing description, mention has been made of a mode-number word $ID_0$ which specifies the particular combination of identification words $ID_1$ through $ID_5$ under mode number $M_7$, it is advantageous to prepare a set of other combinations (Mx, My) of identification words and record such combinations respectively on different tracks using two video heads A and B by taking advantage of their track separation capability.

Figures 15D, 20:
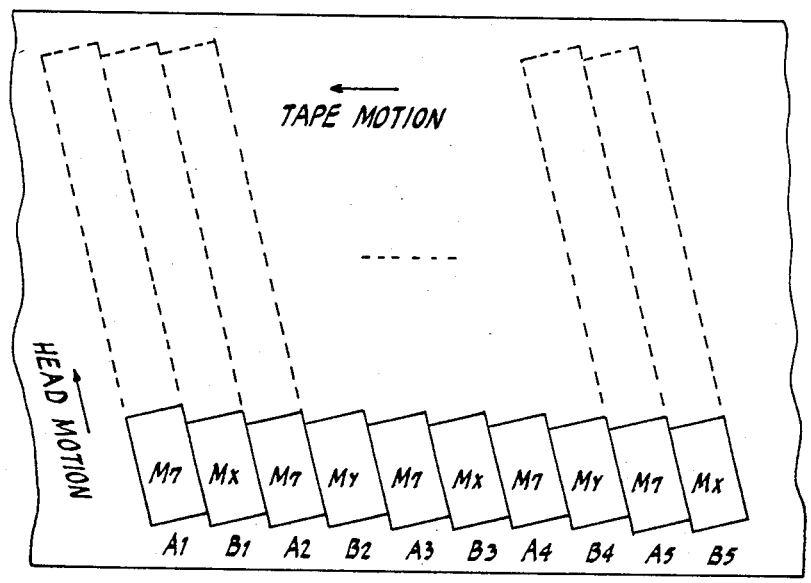
Figure 18:
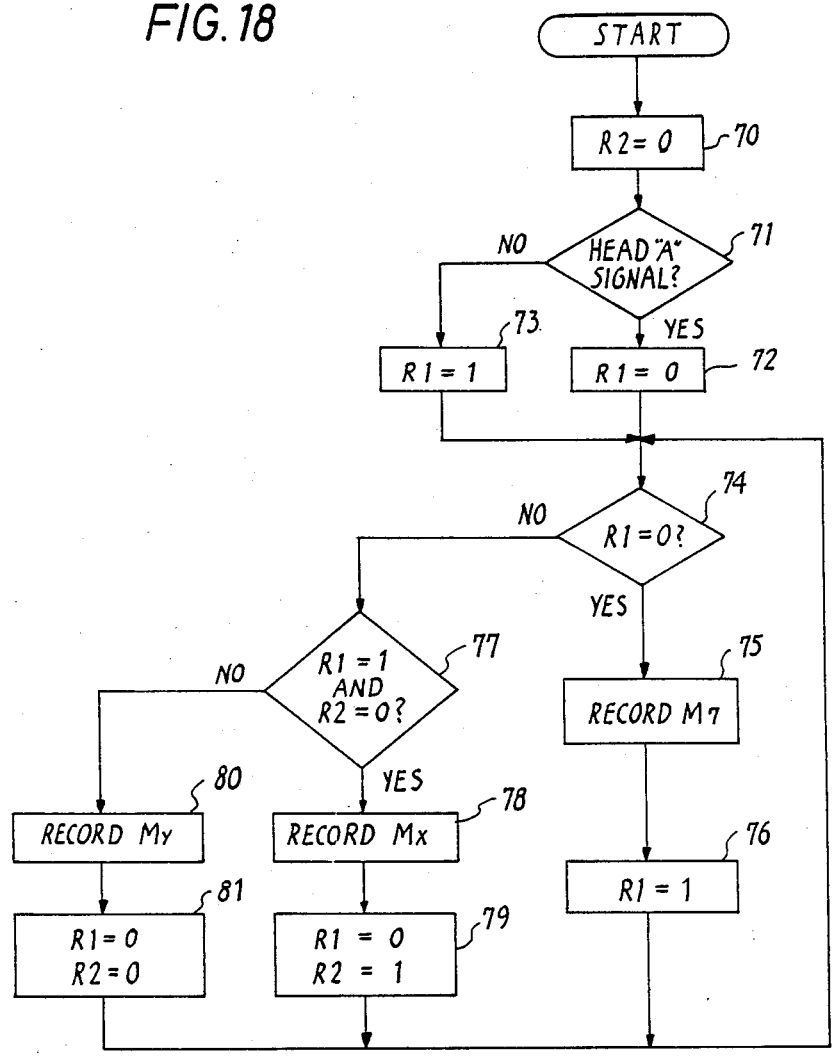
FIG. 18 is a flowchart describing the operation of the microprocessor when different combinations of identification words are to be recorded on different tracks.

To provide such multi-head recording, the program of FIG. 16 is modified as shown in FIG. 18. The program calls for an initialization step in block 70 which initializes a flag R2 to "0" to indicate that video head A is to be switched in for recording a combination of identification words specified by the discrimination word $ID_0$ (=$M_7$). Exit is then to decision block 71 which tests to see if the head A is reproducing a signal by detecting the presence of the associated head switching signal. If the answer is affirmative, exit from block 71 is to operations block 72 which initializes a flag R1 to "0", and if the answer is negative, exit is to operations block 73 which directs the setting of the flag R1 to "1". Exit from either block 72 or 73 is to decision block 74 which tests for the presence of flag R1=0. If there is one, the program proceeds to operations block 75 which directs the recording of the identification words $ID_0$ through $ID_5$ through video head A in a manner identical to that shown in FIG. 16, leaving the trace of a sector $A_1$ as shown in FIG. 20. Exit then is to operations block 76 which directs the setting of flag R1 to "1". The program now returns to decision block 74. Since flag R1 is set, exit from decision block 74 is to decision block 77 which tests for the simultaneous presence of flags R1=1 and R2=0. If the answer is affirmative, exit from lock 77 is to operations block 78 which directs the recording of identification words specified by Mx through video head B, thus leaving the trace of a sector $B_1$. Exit from block 78 is to operations block 79 which directs the resetting of flag R1 to "0" and setting of flag R2 to "1". The program then returns to block 74. With flags R1=0 and R2=1, exit from decision block 74 is again to operations block 75 to record identification words specified by $ID_0$ (=$M_7$) on a sector $A_2$, setting the flag R1 again in block 76. Control returns to block 74 again. With both flags being set to "1", exit from decision block 74 is to block 77 and thence to operations block 80 which directs the recording of identification words specified by mode number My through video head B on a sector $B_2$. Exit from block 80 is to block 81 which directs the resetting of both flags to zero. Control returns to block 74 to repeat the process.

Figure 19:
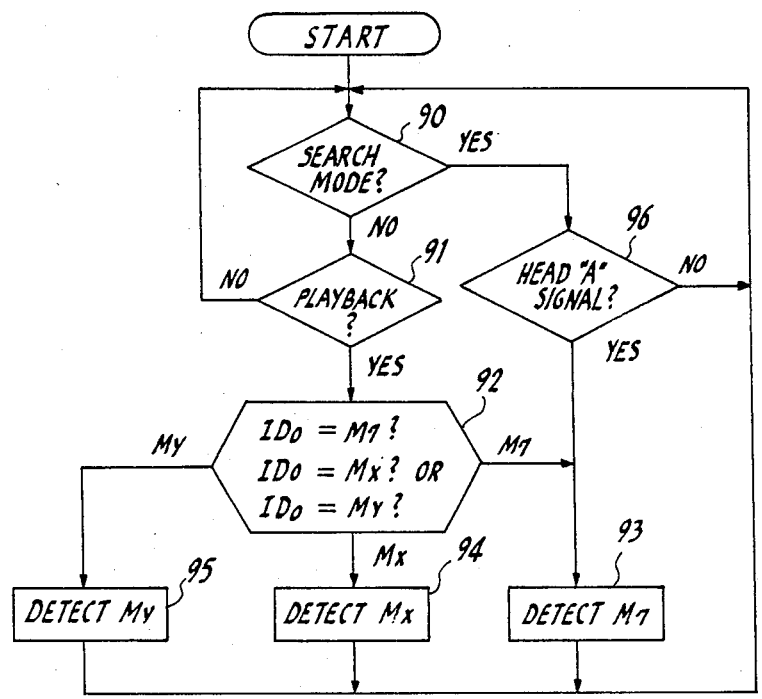
FIG. 19 is a flowchart of instructions performed by the microprocessor when reproducing the identification words recorded in accordance with the flowchart of FIG. 18.

For detecting the recorded identification words $ID_0=M_7$, $ID_0=Mx$ and $ID_0=My$, a program as shown in FIG. 19 can be employed. The program starts with decision block 90 which tests to see if the apparatus is in the automatic search mode. If the answer is negative, the program proceeds to decision block 91 which tests to see if the apparatus is in the playback mode. If the answer is affirmative, exit from decision block 91 is to decision block 92 which checks the contents of the mode-numbering identifying $ID_0$ to distinguish between data that follows. If a mode-number $M_7$ is detected, exit from block 92 is to operations block 93 which performs the word decoding routine of FIG. 17. Operations blocks 94 and 95 are selected according to the decision taken by block 92 to perform respective decoding operations according to particular algorithms. The above operations can be performed during playback modes since the video heads are able to detect the mode-number identifying words and the words that follow. However, during high speed search modes, the video heads fail to trace the track and for this reason the discrimination word $ID_0$ cannot be utilized for decoding purposes. To enable the decoding operation to be effected during search modes, exit from decision block 90 is to decision block 96 if the answer is affirmative in the decision block 90. Block 96 tests for the presence of signals from video head A. If the answer is affirmative, exit from block 96 is to operations block 93 and if the answer is negative, the program returns to block 90.

Since the "year", "month" and "day of the month" data are not used during automatic search modes, these data are preferably recorded on tracks traced by head B while the time lapse data are recorded on tracks traced by head A.

As is seen from FIG. 20, the identification words recorded on tracks A are exclusively the identification words $ID_0$ to $ID_5$ having a common discrimination word. During a search mode, if the head A first detects a common discrimination word $ID_0$ from a given track A and subsequently detects other identification words separately from other tracks A, the subsequently detected identification words can be discriminated by the previously detected discrimination word as if they were detected during playback modes. Even if the head A detects identification words $ID_2$ and $ID_3$ in a given scan and fails to detect a discrimination word $ID_0$ in that given scan, the detection of a discrimination word $ID_0$ in an earlier scan enables the microprocessor to be conditioned with the earlier detected discrimination word to utilize the discrimination bits of the later detected identification words $ID_2$, $ID_3$ to decode the data bits of these words.

What is claimed is:

1. A magnetic tape recording and reproducing apparatus having at least one transducer head mounted on a rotary drum to scan a magnetic tape wound thereon in a direction oblique to the length of the tape for exchanging an information signal with each of a plurality of parallel tracks when said tape is transported at a normal speed, each of said tracks being divided into a series of sectors so that each of said information signals is recorded on each of a plurality of said sectors, said tape being transported at a higher speed than said normal speed during a search mode, said head scanning the tape in a direction different from the direction of scan at said normal speed when said search is effected, comprising:

means for generating a series of M identification words of N bits each, forming each of said M words into J groups of I identification words (where $J \times I = M$) and at least one of said word groups comprising data bits representing distinct, but mutually closely related items of information and discrimination bits identifying said data bits and supplying said information signal and said word groups to said head during a recording mode to record said word groups at spaced intervals within each of said sectors and interleaved with said information signal, each of said recorded word groups being positioned in a location which can be detected by said head during said search mode to enable the discrimination bits of the detected word group to identify the data bits of said at least one word group.

2. A magnetic tape recording and reproducing apparatus as claimed in claim 1, wherein said apparatus includes first and second transducer heads mounted on said rotary drum, said transducer heads having different azimuth angles with respect to each other, and wherein each of the M identification words includes a discrimination word for identifying a particular combination of the other identification words of said M identification words, said means alternately supplying said information signal and word groups to said first head to record said information signal and word groups at spaced intervals to allow said first head to sequentially detect a said discrimination word from a given track and a said other identification word from a different track during said search mode to cause the detected other identification word to be discriminated by the detected discrimination word.

3. A magnetic tape recording and reproducing apparatus as claimed in claim 2, wherein said means detects said discrimination word of each of the M identification words during a playback mode for discriminating said other identification words and detects the discrimination bits of said at least one word group during said search mode for discriminating the data bits of the detected word group.

4. A magnetic tape recording and reproducing apparatus as claimed in claim 1, wherein said information signal is a time-compressed digitized audio signal.

5. A magnetic tape recording and reproducing apparatus as claimed in claim 1, wherein said data bits comprise time data indicating the length of time elapsed from a predetermined point of said tape.

6. A magnetic tape recording and reproducing apparatus as claimed in claim 5, wherein said time data comprise data for displaying said elapsed time in terms of "second", "minute" and "hour".

7. A magnetic tape recording and reproducing apparatus as claimed in claim 1, wherein said at least one word group comprises first and second 8-bit words, each of the 8-bit words includes a header bit;

said second word including four bits representing the unit of "second" time data and three bits representing the tenth of said "second" time data;

said first word including four bits representing the unit of "minute" time data and three bits representing the tenth of said "minute" time data when the header bit of said second word is binary 0, said four bits representing the unit of "hour" time data and said three bits representing the tenth of the "hour" time data when the header bit of said second word is binary 1; and said "second", "minute" and "hour" time data representing the time lapse from the start of the tape when the header bit of said first word is binary 0 and representing the time lapse from the start of a recorded program when the header bit of said first word is binary 1.

8. A magnetic tape recording and reproducing apparatus as claimed in claim 7, wherein said means detects when said three bits of said first word represents a decimal six and records items of data on said tape other than said time data in the positions of the remaining bits of said first and second words.

9. A magnetic tape recording and reproducing apparatus as claimed in claim 8, wherein said items of data other than said time data represent "month" and "year" calendar data.

10. A magnetic tape recording and reproducing apparatus as claimed in claim 1, wherein said at least one word group comprises first and second 8-bit words, each of the 8-bit words includes a header bit;

said second word including four bits representing the unit of "second" time data and three bits representing the tenth of said "second" time data;

said first word including four bits representing the unit of "hour" time data and three bits representing the tenth of said "hour" time data when the header bit of said first word is binary 1, said four bits representing the unit of "minute" time data and said three bits representing the tenth of the "minute" time data when the header bit of said first word is binary 0; and said "second", "minute" and "hour" time data representing the time lapse from the start of the tape when the header bit of said first word is binary 0 and representing the time lapse from the start of a recorded program when the header bit of said first word is binary 1.

11. A method for operating a magnetic tape recording and reproducing apparatus having at least one trannsducer head mounted on a rotary drum to scan a magnetic tape wound thereon in a direction oblique to the length of the tape for exchanging an information signal with each of a plurality of parallel tracks when said tape is transported at a normal speed, each of said tracks being divided into a series of sectors so that each of said information signals is recorded on each of a plurality of said sectors, said tape being transported at a higher speed than said normal speed for effecting the search of desired identification words, said head scanning the tape in a direction different from the direction of scan at said normal speed when said search is effected, the method comprising:

generating a series of M identification words of N bits each;

forming said M words into J groups of I identification words, at least one of said word groups comprising data bits representing distinct, but mutually closely related items of information and discrimination bits identifying said data bits; and recording said information signal and said word groups at spaced intervals within each of said sectors so that said word groups are interleaved with said information signal and each of said recorded groups can be detected by said head during said search mode to enable the discrimination bits of the detected group to identify the data bits of the same group.

12. A method as claimed in claim 11, wherein said apparatus includes first and second transducer heads mounted on said rotary drum, said transducer heads having different azimuth angles with respect to each other, and wherein each of the M identification words includes a discrimination word for identifying a particular combination of the other identification words of said M identification words, said methods further comprises:

alternately supplying said information signal and word groups to said first head to record said information signal and word groups at spaced intervals;

allowing said first head to sequentially detect a said discrimination word from a given track and a said other identification word from a different track during said search mode; and discriminating the detected other identification word by the detected discrimination word.

13. A method as claimed in claim 12, further comprising:

detecting the discrimination word of each of the M identification words during a playback mode;

discriminating said other identification words by said detected discrimination word;

detecting the discrimination bits of said at least one word group during said search mode; and discriminating the data bits of the detected word group.

* * * * *